United States Patent
Lim (10) Patent No.: US 8,748,835 B2
(45) Date of Patent: Jun. 10, 2014

(54) X-RAY DETECTOR AND METHOD OF DRIVING X-RAY DETECTOR

(75) Inventor: Woo-Jae Lim, Yongin (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 258 days.

(21) Appl. No.: 13/420,925

(22) Filed: Mar. 15, 2012

(65) Prior Publication Data
US 2013/0146777 A1   Jun. 13, 2013

(30) Foreign Application Priority Data
Dec. 8, 2011   (KR) .................. 10-2011-0131111

(51) Int. Cl.
*G01T 1/24* (2006.01)
(52) U.S. Cl.
USPC .................................................. 250/370.09
(58) Field of Classification Search
USPC ............... 250/370.01, 370.08, 370.09
See application file for complete search history.

(56) References Cited

U.S. PATENT DOCUMENTS

| | | | |
|---|---|---|---|
| 6,724,855 B2 * | 4/2004 | Sugawara et al. | 378/19 |
| 7,098,950 B2 | 8/2006 | Yamamoto et al. | |
| 7,223,980 B2 * | 5/2007 | Tanaka et al. | 250/370.09 |
| 7,755,056 B2 * | 7/2010 | Bell | 250/370.09 |
| 8,044,362 B2 * | 10/2011 | Goo et al. | 250/370.09 |
| 2002/0153491 A1 * | 10/2002 | Sugawara et al. | 250/370.09 |
| 2009/0095914 A1 * | 4/2009 | Goo et al. | 250/370.09 |
| 2009/0160971 A1 | 6/2009 | Jung et al. | |
| 2009/0272909 A1 * | 11/2009 | Takenaka et al. | 250/370.09 |

FOREIGN PATENT DOCUMENTS

| KR | 10-0707071 B1 | 4/2007 |
|---|---|---|
| KR | 10-2009-0050250 A | 5/2009 |
| KR | 10-2009-0083818 A | 8/2009 |

* cited by examiner

*Primary Examiner* — Mark R Gaworecki (57) ABSTRACT

An x-ray detector includes a plurality of photosensitive pixels each including a first photodiode generating an electric signal corresponding to an x-ray, and a first switching device turned on by a gate signal and outputting the electric signal from the photodiode through a data line, and a plurality of dummy pixels each including a second photodiode generating an electric signal corresponding to an x-ray, and a second switching device maintaining a turned-off state regardless of a gate signal and blocking the electric signal from being output from the second photodiode to the data line.

17 Claims, 9 Drawing Sheets

X-RAY DETECTOR AND METHOD OF DRIVING X-RAY DETECTOR

CROSS-REFERENCE TO RELATED PATENT APPLICATION

This application claims the benefit of Korean Patent Application No. 10-2011-0131111, filed on Dec. 8, 2011, in the Korean Intellectual Property Office, the disclosure of which is incorporated herein in its entirety by reference.

BACKGROUND

1. Field

The present invention relates to an x-ray detector and a method of driving an x-ray detector.

2. Description of the Related Art

Generally, an x-ray is a short wavelength and thus easily penetrates through a subject. The amount of x-ray penetrating through the subject is determined based on an internal density of the subject. In other words, an internal state of the subject may be indirectly observed via a penetrated amount of x-ray through the subject.

SUMMARY

According to an example embodiment, there is provided an x-ray detector, including a plurality of photosensitive pixels each including a first photodiode generating an electric signal corresponding to an x-ray, and a first switching device turned on by a gate signal and outputting the electric signal from the photodiode through a data line, and a plurality of dummy pixels each including a second photodiode generating an electric signal corresponding to an x-ray, and a second switching device maintaining a turned-off state regardless of a gate signal and blocking the electric signal from being output from the second photodiode to the data line.

The plurality of photosensitive pixels may be disposed in an active area generating an effective image, and the plurality of dummy pixels may be disposed in a non-active area outside the active area.

The first photodiode may include a first electrode, a second electrode facing the first electrode and connected to a bias line, and a photoconductive layer disposed between the first and second electrodes.

The first switching device may include a gate electrode, an active pattern disposed on the gate electrode, and source and drain electrodes disposed on the active pattern.

The x-ray detector may further include a connector electrically connecting one of the source and drain electrodes of the first switching device to the data line.

The second switching device may include a gate electrode and an active pattern disposed on the gate electrode, and may not include source and drain electrodes.

The x-ray detector may further include a metal pattern disposed at one side of the active pattern of the second switching device, and a connector electrically connecting the metal pattern and the data line.

The second switching device may include a gate electrode and source and drain electrodes disposed on the gate electrode, and may not include an active pattern.

The x-ray detector may further include a connector electrically connecting one of the source and drain electrodes of the second switching device to the data line.

The x-ray detector may further include a readout circuit reading out the electric signal of each of the plurality of photosensitive pixels and the electric signal of each of the plurality of dummy pixels through the corresponding data line.

The x-ray detector may further include a signal processor obtaining an effective image based on the read out electric signal of each of the plurality of photosensitive pixels, obtaining a noise image based on the read out electric signal of each of the plurality of dummy pixels, and removing noise included in the effective image by subtracting the noise image from the effective image.

According to an example embodiment, there is provided a method of driving an x-ray detector, the method including irradiating an x-ray to a panel including a photosensitive pixel and a dummy pixel, sequentially outputting a gate signal to the panel to which the x-ray is irradiated, transmitting an electric signal corresponding to an x-ray from a photodiode connected to a switching device of the photosensitive pixel turned on by the gate signal, to a data line, and reading out an electric signal output by the photosensitive pixel and an electric signal output by the dummy pixel through the data line. A switching device of the dummy pixel may maintain a turned-off state regardless of the gate signal, and block an electric signal corresponding to an x-ray from a photodiode connected to the switching device of the dummy pixel from being transmitted to the data line.

The photosensitive pixel may be disposed in an active area generating an effective image, and the dummy pixel may be disposed in a non-active area outside the active area.

The method may further include obtaining an effective image based on the read out electric signal of the photosensitive pixel, obtaining a noise image based on the read out electric signal of the dummy pixel simultaneous with obtaining the effective image, and removing noise included in the effective image by subtracting the noise image from the effective image.

A readout signal of the photosensitive pixel may represent the electric signal of the photodiode and a noise signal of the data line, and a readout signal of the dummy pixel may represent only the noise signal of the data line.

The switching device of the dummy pixel may include a gate electrode and an active pattern disposed on the gate electrode, and may not include source and drain electrodes so as to block transmission of the electric signal generated by the photodiode connected to the switching device of the dummy pixel.

The switching device of the dummy pixel may include a gate electrode and source and drain electrodes disposed on the gate electrode, and may not include an active pattern so as to block transmission of the electric signal generated by the photodiode connected to the switching device of the dummy pixel.

BRIEF DESCRIPTION OF THE DRAWINGS

The above and other features and advantages will become more apparent by describing in detail example embodiments thereof with reference to the attached drawings in which.

DETAILED DESCRIPTION

Hereinafter, example embodiments will be described more fully with reference to the accompanying drawings. In the drawings, like reference numerals denote like elements, and the sizes and thicknesses of layers and regions are exaggerated for clarity. Also, detailed descriptions about related well-known functions or configurations that may diminish the clarity of the description may be omitted. As used herein, the team "and/or" includes any and all combinations of one or more of the associated listed items.

Figure 1:
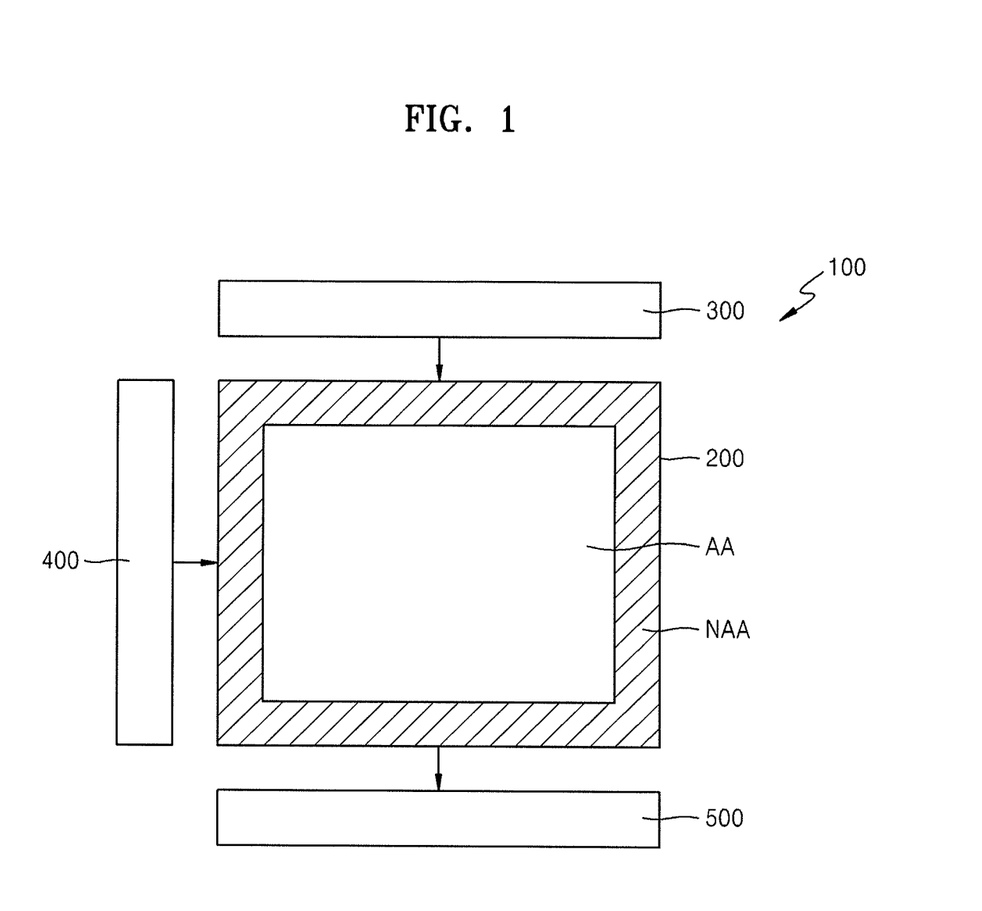
FIG. 1 is a diagram schematically illustrating an x-ray detector according to an example embodiment.

FIG. 1 is a diagram schematically illustrating an x-ray detector 100 according to an example embodiment.

In the example embodiment shown in FIG. 1, the x-ray detector 100 includes a panel 200, a bias driver 300, a gate driver 400, and a readout integrated circuit (IC) 500. In FIG. 1, gate lines GL, data lines DL, and bias lines BL are not shown.

The panel 200 detects an x-ray and performs photoelectric conversion on the detected x-ray to output an electric signal. The panel 200 includes a plurality of pixels disposed in a matrix shape by a plurality of gate lines GL in a row direction and a plurality of data lines DL in a column direction. The gate and data lines GL and DL may perpendicularly cross each other.

The panel 200 is divided into an active area AA and a non-active area NAA outside (around) the active area AA. Pixels in the active area AA are photosensitive pixels OPX for outputting a signal of an effective image, and pixels in the non-active area NAA are dummy pixels DPX used for obtaining a line noise for removing noise from the effective image. Each pixel includes a photodiode PD and a transistor Tr. The non-active area NAA may include one or more rows of dummy pixels DPX disposed parallel to the photosensitive pixels OPX in the row direction where the gate line GL is formed and/or one or more columns of dummy pixels DPX disposed parallel to the photosensitive pixels DPS in the column direction where the data line DL is formed.

The bias driver 300 applies a driving voltage to the bias lines BL. The bias driver 300 may selectively apply reverse bias and forward bias to the photodiode PD. The bias line BL may be parallel to the data line DL.

The gate driver 400 sequentially applies gate signals to the gate lines GL. The gate driver 400 is in an IC form to be installed at one side of the panel 200 or directly formed in the panel 200 via a thin-film forming process.

The readout IC 500 reads the electric signal of each pixel through the data lines DL. The readout IC 500 reads a first signal S1 from the pixels in the active area AA and a second signal S2 from the pixels in the non-active area NAA.

Figure 2:
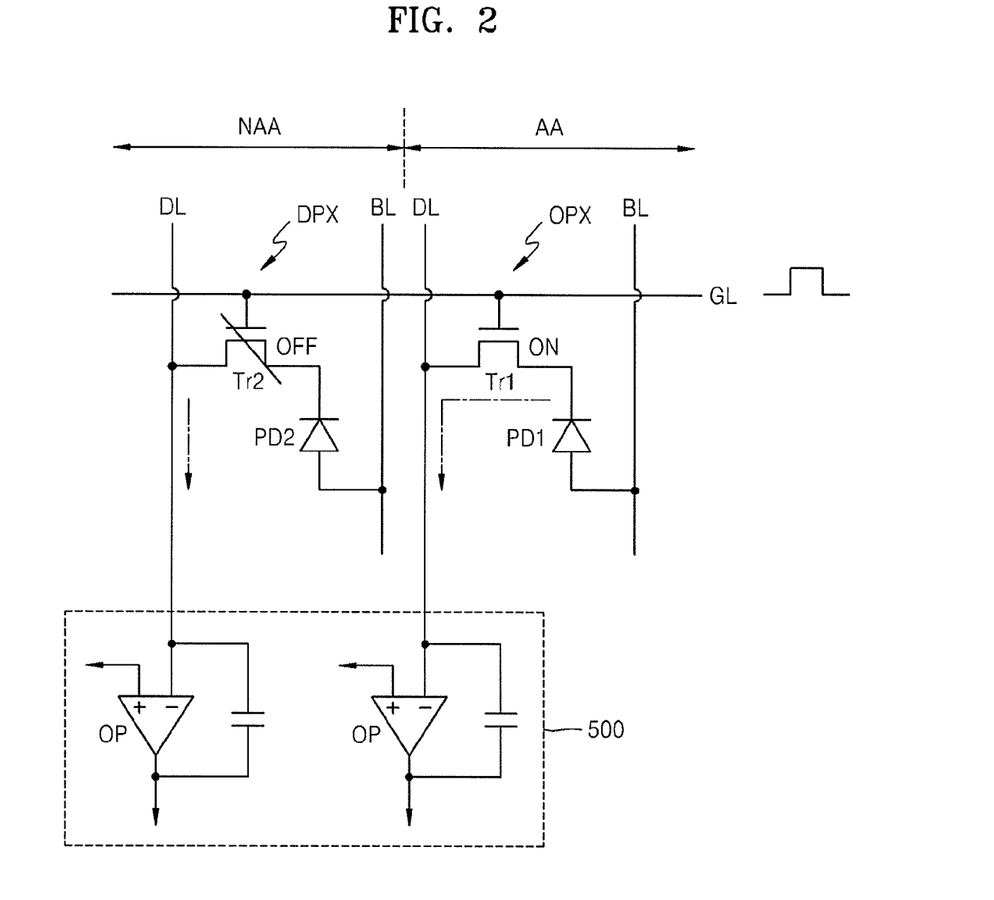
FIG. 2 is a circuit diagram of internal circuits of a photosensitive pixel and dummy pixel of FIG. 1.

FIG. 2 is a circuit diagram of internal circuits of the photosensitive pixel OPX and dummy pixel DPX of FIG. 1.

In the example embodiment shown in FIG. 2, each of the photosensitive pixels OPX in the active area AA includes a first photodiode PD1 outputting an electric signal, for example, a photo-detection voltage, by detecting the x-ray, and a first transistor Tr1 switching the electric signal output from the first photodiode PD1.

The first photodiode PD1 detects the x-ray and outputs the detected x-ray as the electric signal. The first photodiode PD1 may be a PIN diode. A first electrode of the first photodiode PD1 is electrically connected to a drain electrode of the first transistor Tr1, and a second electrode of the photodiode PD1 is electrically connected to the bias line BL to which a bias voltage is applied.

The first transistor Tr1 is a switching device for switching the electric signal output from the first photodiode PD1. A gate electrode of the first transistor Tr1 is electrically connected to the gate line GL, and a source electrode of the first transistor Tr1 is electrically connected to the data line DL.

When a gate signal is applied to the gate line GL, the first transistor Tr1 is turned on, and the electric signal output from the first photodiode PD1 is output to an amplifier OP of the readout IC 500 through the data line DL by the turned-on first transistor Tr1. A signal output at this time may include the electric signal output from the first photodiode PD1 and line noise on the data line DL.

Each of the dummy pixels DPX in the non-active area NAA includes a second photodiode PD2 and a second transistor Tr2.

The second photodiode PD2 detects the x-ray and outputs the detected x-ray as an electric signal. The second photodiode PD2 may be a PIN diode.

The second transistor Tr2 maintains a turned-off state even if the gate signal is applied to the gate line GL, and does not switch the electric signal output from the second photodiode PD2. Accordingly, only the electric signal of the data line DL connected to the second transistor Tr2, i.e., the line noise, is output to the amplifier OP of the readout IC 500. A structure of the second transistor Tr2 maintaining the turned-off state regardless of the gate signal is described below in detail.

Figure 3:
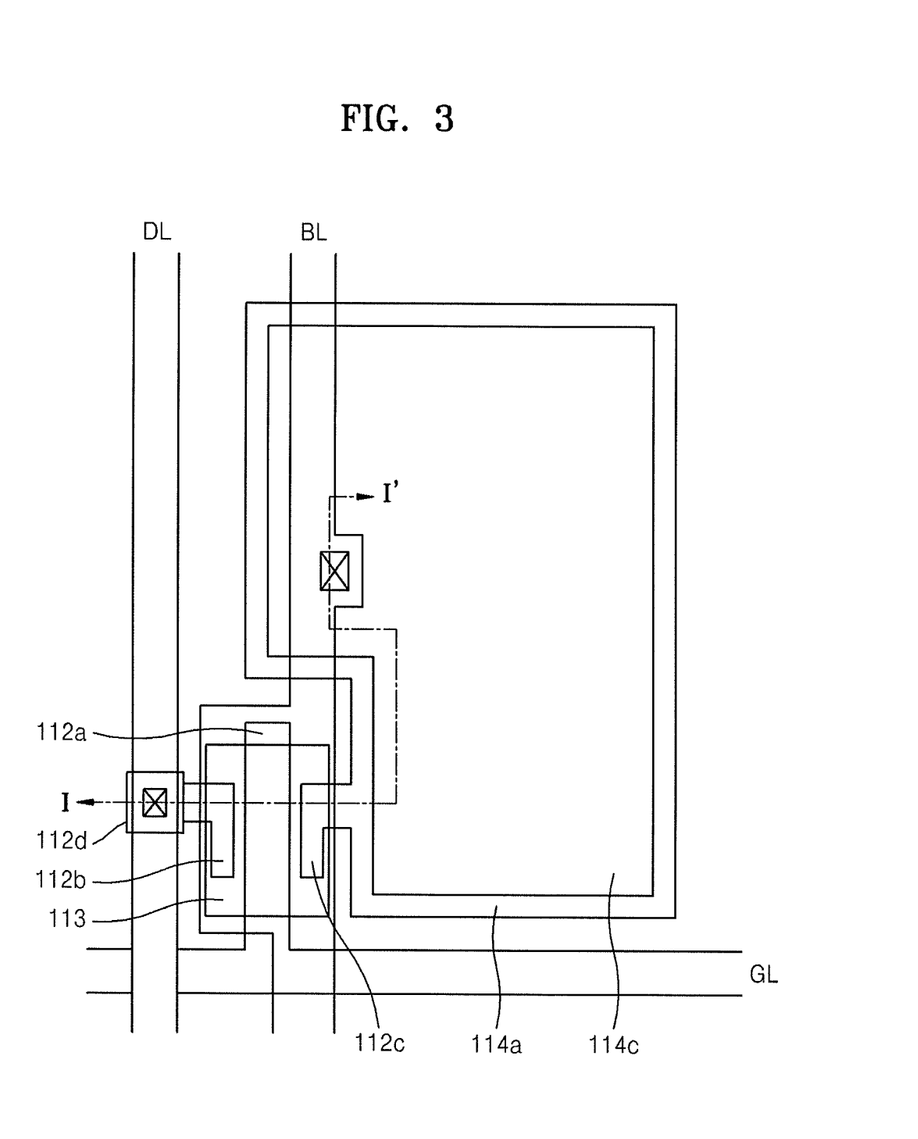
FIG. 3 is a plan view of a photosensitive pixel according to an example embodiment.
Figure 4:
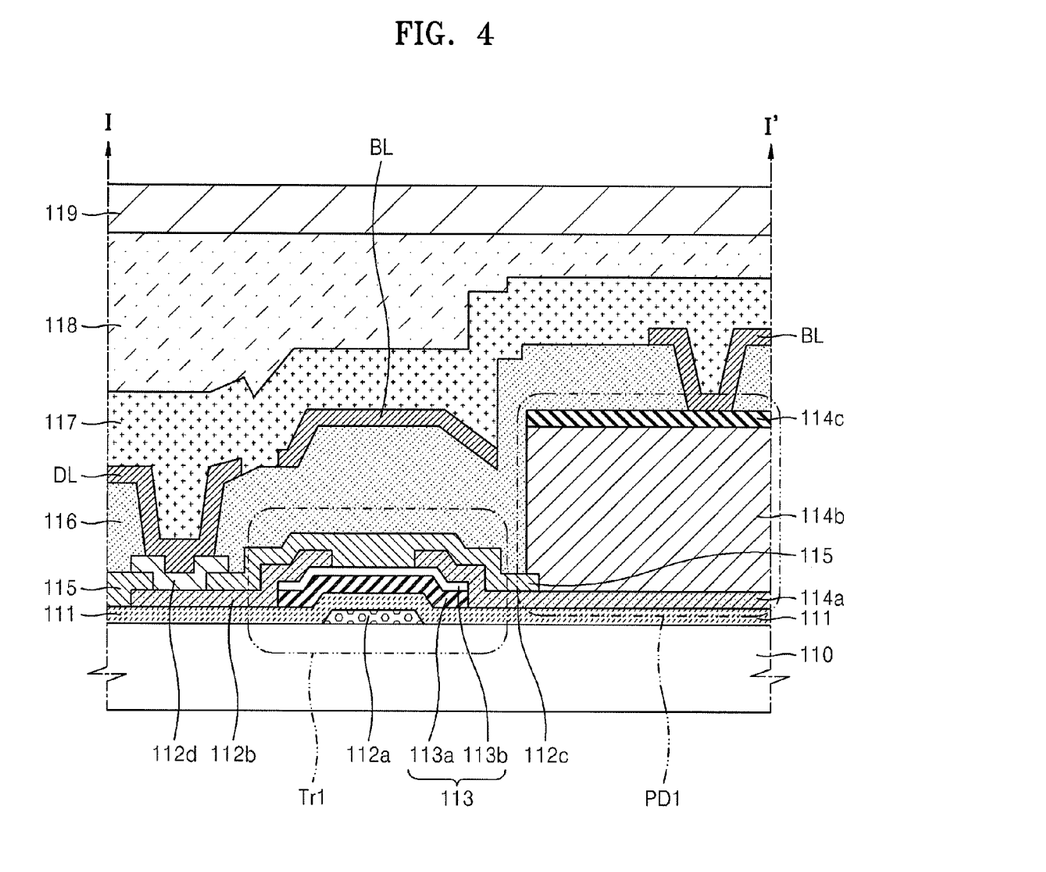
FIG. 4 is a cross-sectional view of the photosensitive pixel of FIG. 3 taken along a line I-I'.

FIG. 3 is a plan view of a photosensitive pixel OPX according to an example embodiment, and FIG. 4 is a cross-sectional view of the photosensitive pixel OPX of FIG. 3 taken along a line I-I'.

In the example embodiment shown in FIGS. 3 and 4, the photosensitive pixel OPX in the active area AA includes the first transistor Tr1 and the first photodiode PD1 on a first substrate 110. The first transistor Tr1 may include a gate electrode 112a, an active pattern 113, a source electrode 112b, and a drain electrode 112c. The first photodiode PD1 may include a first electrode 114a, a photoconductive layer 114b, and a second electrode 114c.

The first substrate 110 may have a plate shape, and may be formed of, e.g., transparent glass or plastic.

The gate electrode 112a of the first transistor Tr1 is formed on the first substrate 110. The gate electrode 112a may protrude from the gate line GL, and may be formed of the same material as the gate line GL. For example, the gate electrode 112a may be formed of a single conductive layer or multiple conductive layers including, e.g., at least one of aluminum (Al), chromium (Cr), molybdenum (Mo), copper (Cu), titanium (Ti), neodymium (Nd), tungsten (W), gold (Au), and silver (Ag).

The gate electrode 112a is covered by a gate insulation film 111. The gate insulation film 111 may include a single insulation layer or multiple insulation layers including, e.g., at least one of silicon nitride ($SiN_x$) and silicon oxide ($SiO_x$).

The active pattern 113 of the first transistor Tr1 is formed on the gate insulation film 111. The active pattern 113 may include a channel layer 113a formed on the gate insulation film 111, and an ohmic contact layer 113b formed on the channel layer 113a. The channel layer 113a may include a semiconductor material, such as amorphous silicon (a-Si) or polysilicon, and the ohmic contact layer 113b may include silicide or high density ion-doped amorphous silicon (such as n+a-Si). The ohmic contact layer 113b is disposed between the channel layer 113a and the source and drain electrodes 112b and 112c, so as to reduce contact resistance between the channel layer 113a and the source and drain electrodes 112b and 112c.

The source and drain electrodes 112b and 112c of the first transistor Tr1 are formed on the active pattern 113, and the source and drain electrodes 112b and 112c are spaced apart from each other by a predetermined interval. The source and drain electrodes 112b and 112c may be formed of the same material as the data line DL. The source and drain electrodes 112b and 112c may include a single conductive layer or multiple conductive layers including, e.g., at least one of Al, Cr, Mo, Cu, Ti, Nd, W, Au, and Ag.

The first electrode 114a of the first photodiode PD1 may be integrally formed with and electrically connected to the drain electrode 112c of the first transistor Tr1 on the gate insulation film 111.

A first insulation layer 115 is disposed on the source electrode 112b, the drain electrode 112c, and the first electrode 114a, and includes a single insulation layer or multiple insulation layers including, e.g., at least one of $SiN_x$ and $SiO_x$. The first insulation layer 115 includes an opening exposing a part of the source electrode 112b and an opening exposing a part of the first electrode 114a.

A connector 112d connecting the source electrode 112b and the data line DL is formed in the opening of the first insulation layer 115, which exposes the part of the source electrode 112b. The connector 112d is disposed between the source electrode 112b and the data line DL.

The photoconductive layer 114b of the first photodiode PD1 is formed in the opening of the first insulation layer 115, which exposes the part of the first electrode 114a. Although not illustrated, the photoconductive layer 114b may have a structure in which an n-type silicon layer, an intrinsic silicon layer, and a p-type silicon layer are sequentially stacked.

The second electrode 114c is formed on the photoconductive layer 114b while facing the first electrode 114a. The second electrode 114c may include a transparent conductive material, such as indium tin oxide (ITO) or indium zinc oxide (IZO), through which light from the x-ray is applied into the photoconductive layer 114b.

A second insulation layer 116 is formed on an entire surface of the first substrate 110 while covering the first photodiode PD1 and the first transistor Tr1. The second insulation layer 116 may include a single insulation layer or multiple insulation layers including, e.g., at least one of $SiN_x$ and $SiO_x$. The data line DL and the bias line BL are disposed on the second insulation layer 116.

The second insulation layer 116 includes an opening for exposing a part of the second electrode 114c of the first photodiode PD1, and an opening for exposing a part of the connector 112d. The bias line BL may be formed in the opening for exposing the part of the second electrode 114c, so as to be electrically connected to the second electrode 114c of the first photodiode PD1. The data line DL may be formed in the opening for exposing the part of the connector 112d, so as to be connected to the source electrode 112b. In another implementation, the connector 112d may not be formed so that the data line DL and the source electrode 112b are directly connected to each other.

The data line DL is formed to cross the gate line GL across the first and second insulation layers 115 and 116.

The bias line BL is formed parallel to the data line DL. The bias line BL and the data line DL may be formed from one conductive layer (e.g., by using a micro machining process such as used to form a micro electro mechanical system (MEMS), such as a photolithography process), and may include a single conductive layer or multiple conductive layers including, e.g., at least one of Al, Cr, Mo, Cu, Ti, Nd, W, Au, and Ag. A third insulation layer 117 is formed on an entire surface of the first substrate 110 while covering the bias line BL and the data line DL. The third insulation layer 117 may include a single insulation layer or multiple insulation layers including, e.g., at least one of $SiN_x$ and $SiO_x$.

A planarization layer 118 formed of an organic or inorganic material is formed on the third insulation layer 117.

A scintillator 119 is disposed on the planarization layer 118. The scintillator 119 changes the x-ray incident through a subject into a visible ray, and transmits the visible ray toward the first substrate 110. The scintillator 119 may be formed, e.g., of cesium iodide. A second substrate (not shown) may be disposed on the scintillator 119.

Figure 5:
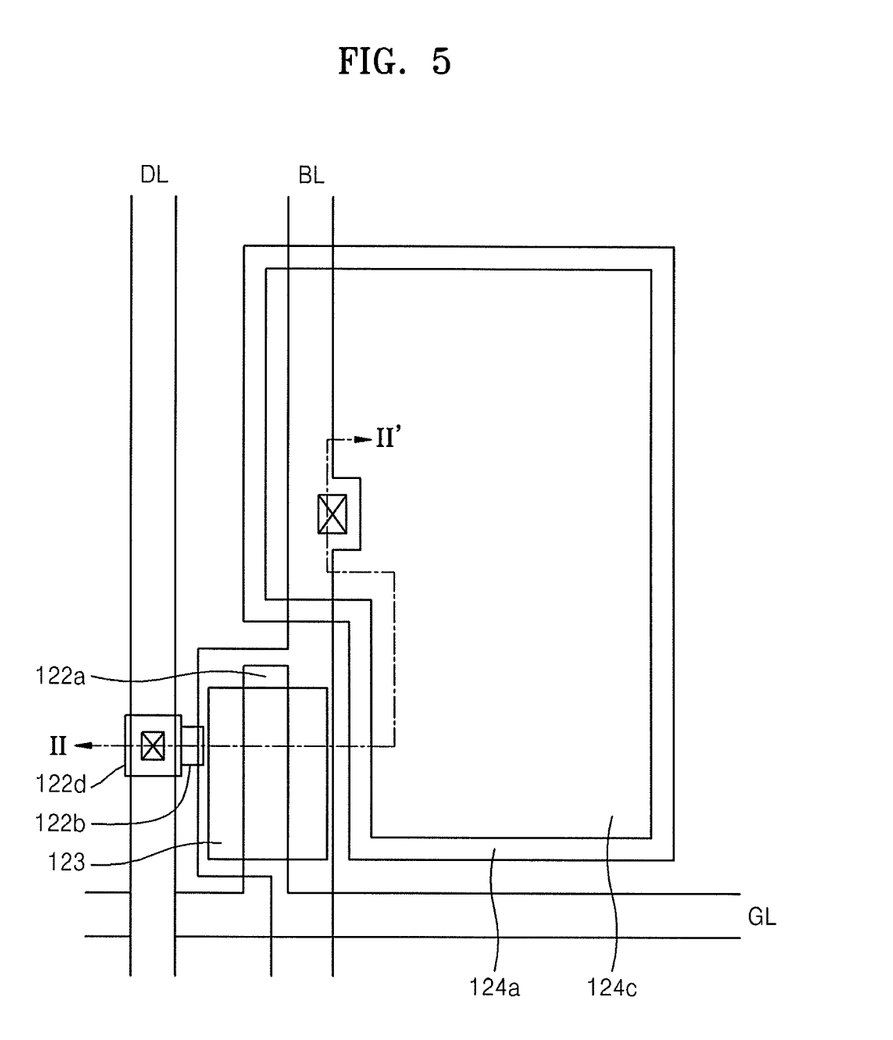
FIG. 5 is a plan view of a dummy pixel according to an example embodiment.
Figure 6:
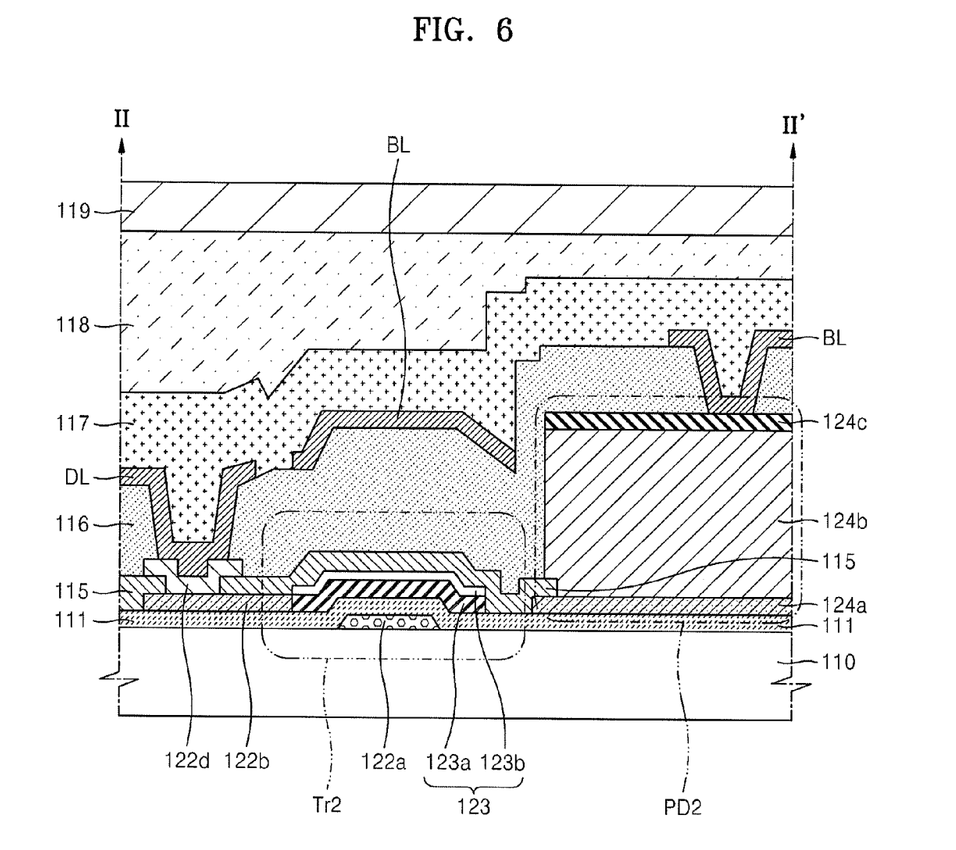
FIG. 6 is a cross-sectional view of the dummy pixel of FIG. 5 taken along a line II-II'.

FIG. 5 is a plan view of a dummy pixel DPX according to an example embodiment, and FIG. 6 is a cross-sectional view of the dummy pixel DPX of FIG. 5 taken along a line II-II'.

In the example embodiment shown in FIGS. 5 and 6, the dummy pixel DPX of the non-active area NAA includes the second transistor Tr2 and the second photodiode PD2 on the first substrate 110. The second transistor Tr2 includes a gate electrode 122a and an active pattern 123, and does not include source and drain electrodes. The second photodiode PD2 may include a first electrode 124a, a photoconductive layer 124b, and a second electrode 124c.

The first substrate 110 may have a plate shape, and may be formed of, e.g., transparent glass or plastic.

The gate electrode 122a of the second transistor Tr2 is formed on the first substrate 110. The gate electrode 122a may protrude from the gate line GL, and may be formed of the same material as the gate line GL. For example, the gate electrode 112a may include a single conductive layer or multiple conductive layers including, e.g., at least one of Al, Cr, Mo, Cu, Ti, Nd, W, Au, and Ag.

The gate electrode 122a is covered by the gate insulation film 111. The gate insulation film 111 may include a single insulation layer or multiple insulation layers including, e.g., at least one of $SiN_x$ and $SiO_x$.

The active pattern 123 of the second transistor Tr2 is formed on the gate insulation film 111. The active pattern 123 may include a channel layer 123a formed on the gate insulation film 111, and an ohmic contact layer 123b formed on the channel layer 123a. The channel layer 123a may include a semiconductor material such as a-Si or polysilicon, and the ohmic contact layer 123b may include, e.g., n+ a-Si or silicide. In another implementation, the ohmic contact layer 123b may be omitted.

A metal layer may be formed on the active pattern 123 and then patterned to form a metal pattern 122b connected to the data line DL, and the first electrode 124a of the second photodiode PD2 on the same layer as the active pattern 123. The metal pattern 122b and the first electrode 124a may be simultaneously formed in a manner similar to formation of the source and drain electrodes 112b and 112c of the first transistor Tr1. The metal pattern 122b and the first electrode 124a may include a single conductive layer or multiple conductive layers including, e.g., at least one of Al, Cr, Mo, Cu, Ti, Nd, W, Au, and Ag.

The first insulation layer 115 is formed on the active pattern 123, the metal pattern 122b, and the first electrode 124a, and may include a single insulation layer or multiple insulation layers including, e.g., at least one of $SiN_x$ and $SiO_x$. The first insulation layer 115 includes an opening exposing a part of the metal pattern 122b and an opening exposing a part of the first electrode 124a.

A connector 122d connecting the metal pattern 122b and the data line DL is formed in the opening of the first insulation layer 115, which exposes the part of the metal pattern 122b. The connector 122d is disposed between the metal pattern 122b and the data line DL.

The photoconductive layer 124b of the second photodiode PD2 is formed in the opening of the first insulation layer 115, which exposes the part of the first electrode 124a. Although not illustrated, the photoconductive layer 124b may have a structure in which an n-type silicon layer, an intrinsic silicon layer, and a p-type silicon layer are sequentially stacked.

The second electrode 124c is formed on the photoconductive layer 124b while facing the first electrode 124a. The second electrode 124c may include a transparent conductive material, such as ITO or IZO.

The second insulation layer 116 is formed on an entire surface of the first substrate 110 while covering the second photodiode PD2 and the second transistor Tr2. The second insulation layer 116 includes a single insulation layer or multiple insulation layers including, e.g., at least one of $SiN_x$ and $SiO_x$. The data line DL and the bias line BL are disposed on the second insulation layer 116.

The second insulation layer 116 includes an opening for exposing a part of the second electrode 124c of the second photodiode PD2, and an opening for exposing a part of the connector 122d. The bias line BL may be formed in the opening for exposing the part of the second electrode 124c so as to be electrically connected to the second electrode 124c of the second photodiode PD2. The data line DL may be formed in the opening for exposing the part of the connector 122d to be connected to the metal pattern 122b. In another implementation, the connector 122d may not be formed so that the data line DL and the metal pattern 122b are directly connected to each other.

The data line DL is formed to cross the gate line GL across the first and second insulation layers 115 and 116.

The bias line BL is formed parallel to the data line DL. The bias line BL and the data line DL may be formed from one conductive layer by using the process as described above, such as a photolithography process, and may include a single conductive layer or multiple conductive layers including, e.g., at least one of Al, Cr, Mo, Cu, Ti, Nd, W, Au, and Ag. The third insulation layer 117 is formed on an entire surface of the first substrate 110 while covering the bias line BL and the data line DL. The third insulation layer 117 may include a single insulation layer or multiple insulation layers including one of $SiN_x$ and $SiO_x$.

The planarization layer 118 formed of an organic or inorganic material is formed on the third insulation layer 117.

The scintillator 119 is disposed on the planarization layer 118. The scintillator 119 changes the x-ray incident through a subject into a visible ray, and transmits the visible ray toward the first substrate 110. The scintillator 119 may be formed of, e.g., cesium iodide. A second substrate (not shown) may be disposed on the scintillator 119.

In the current embodiment, source and drain electrodes are not formed in the second transistor Tr2 so as to block forming of a channel that transmits the electric signal of the second photodiode PD2. Accordingly, the readout IC 500 may only read out a noise signal of the data line DL.

In FIGS. 5 and 6, the second photodiode PD2 includes the first and second electrodes 124a and 124c. In another implementation, a photoelectric conversion function of the second photodiode PD2 may be blocked by removing at least one of the first and second electrodes 124a and 124c.

Figure 7:
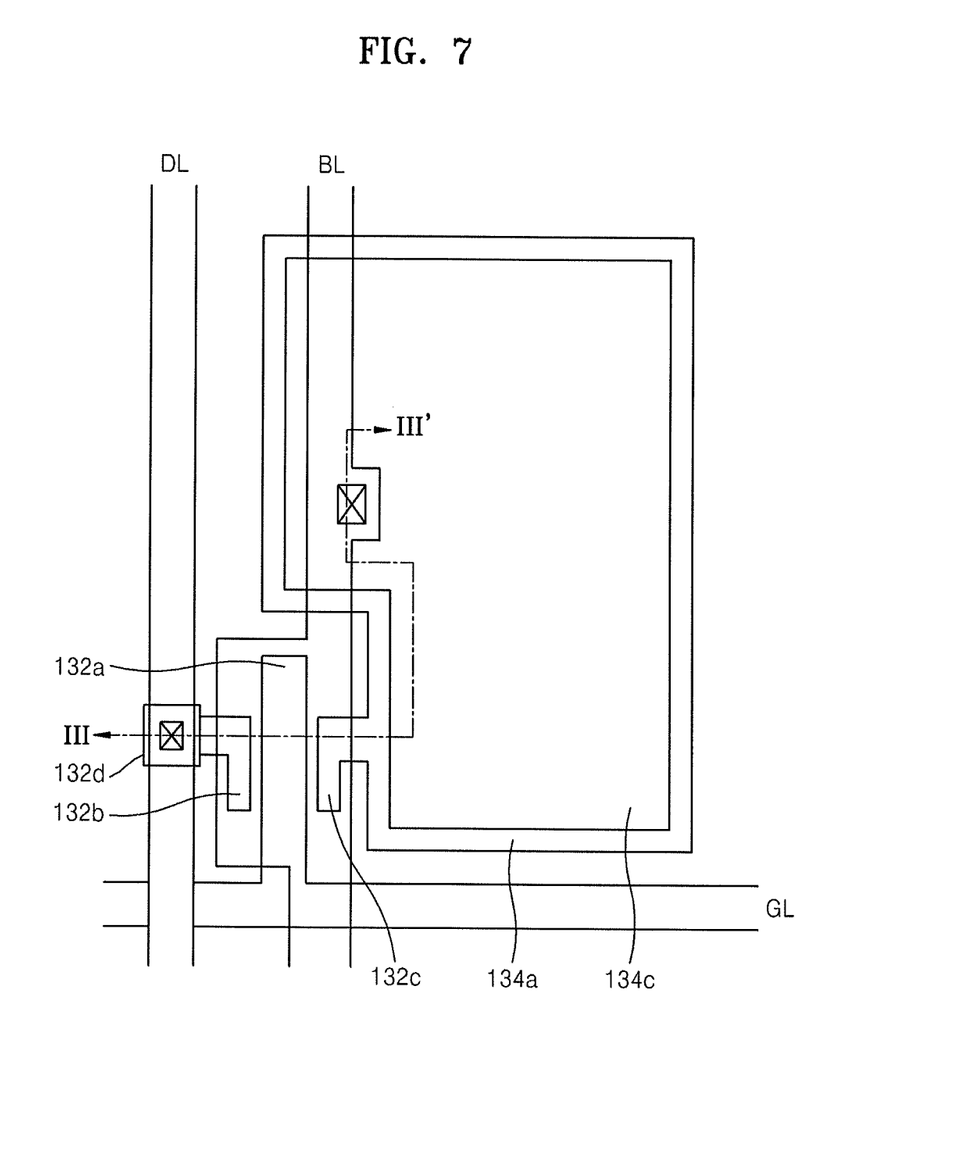
FIG. 7 is a plan view of a dummy pixel according to another embodiment of the present invention.
Figure 8:
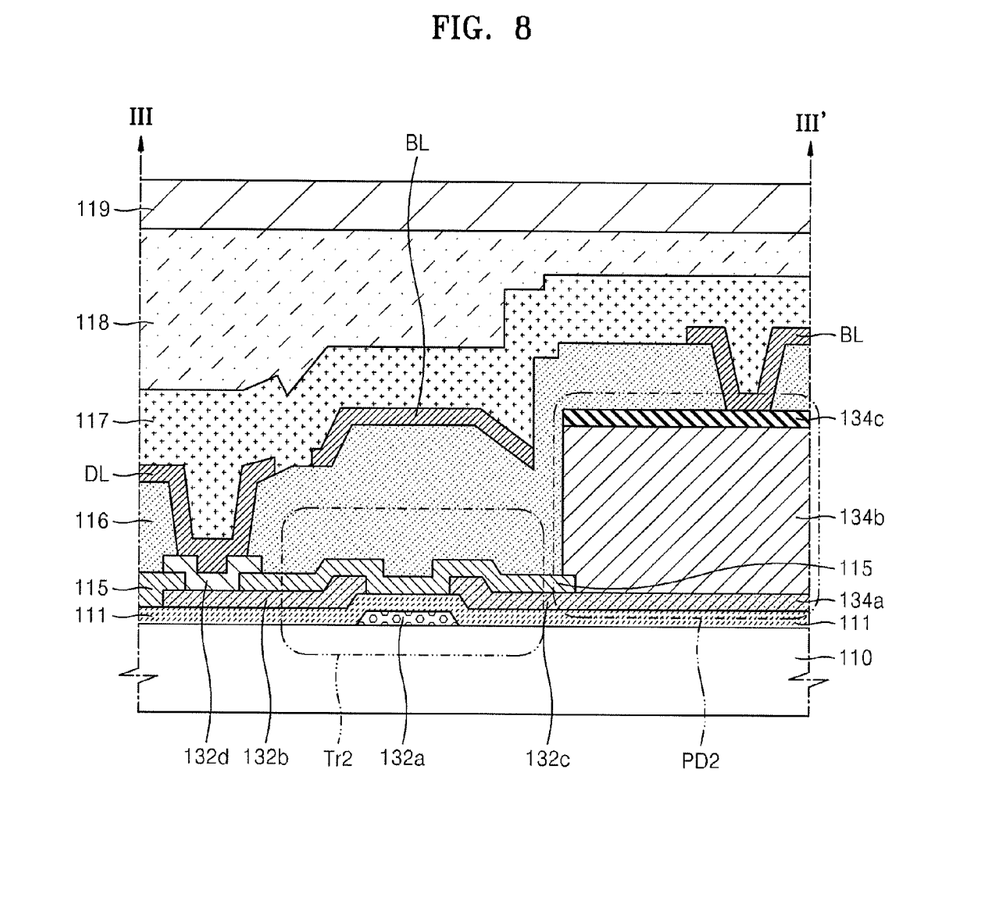
FIG. 8 is a cross-sectional view of the dummy pixel of FIG. 7 taken along a line III-III'.

FIG. 7 is a plan view of a dummy pixel DPX according to another example embodiment, and FIG. 8 is a cross-sectional view of the dummy pixel DPX of FIG. 7 taken along a line III-III'.

In the example embodiment shown in FIGS. 7 and 8, the dummy pixel DPX of the non-active area NAA includes the second transistor Tr2 and the second photodiode PD2 on the first substrate 110. The second transistor Tr2 includes a gate electrode 132a, a source electrode 132b, and a drain electrode 132c, and does not include an active pattern. The second photodiode PD2 includes a first electrode 134a, a photoconductive layer 134b, and a second electrode 134c.

The first substrate 110 may have a plate shape, and may be formed of, e.g., transparent glass or plastic.

The gate electrode 132a of the second transistor Tr2 is formed on the first substrate 110. The gate electrode 132a may protrude from the gate line GL, and may be formed of the same material as the gate line GL. For example, the gate electrode 132a may include a single conductive layer or multiple conductive layers including, e.g., at least one of Al, Cr, Mo, Cu, Ti, Nd, W, Au, and Ag.

The gate electrode 132a is covered by the gate insulation film 111. The gate insulation film 111 may include a single insulation layer or multiple insulation layers including, e.g., at least one or $SiN_x$ and $SiO_x$.

In the present example embodiment, an active pattern of the second transistor Tr2 is not formed on the gate insulation film 111, but the source and drain electrodes 132b and 132c of the second transistor Tr2 are formed on the gate insulation film 111. The source and drain electrodes 132b and 132c are spaced apart from each other by a predetermined interval. The source and drain electrodes 132b and 132 may be simultaneously formed as the source and drain electrodes 112b and 112c of the first transistor Tr1. The source and drain electrodes 132b and 132c may be formed of the same material as the data line DL. The source and drain electrodes 132b and 132c may include a single conductive layer or multiple conductive layers including, e.g., at least one of Al, Cr, Mo, Cu, Ti, Nd, W, Au, and Ag.

The first electrode 134a of the second photodiode PD2 may be integrally formed with the drain electrode 132c of the second transistor Tr2 on the gate insulation film 111.

The first insulation layer 115 is disposed on the source electrode 132b, the drain electrode 132c, and the first electrode 134a, and includes a single insulation layer or multiple insulation layers including, e.g., at least one of $SiN_x$ and $SiO_x$. The first insulation layer 115 includes an opening for exposing a part of the source electrode 132b and an opening for exposing a part of the first electrode 134a.

A connector 132d connecting the source electrode 132b and the data line DL is formed in the opening of the first insulation layer 115, which exposes the part of the source electrode 132b. The connector 132d is disposed between the source electrode 132b and the data line DL.

The photoconductive layer 134b of the second photodiode PD2 is formed in the opening of the first insulation layer 115, which exposes the part of the first electrode 134a. Although not illustrated, the photoconductive layer 134b may have a structure in which an n-type silicon layer, an intrinsic silicon layer, and a p-type silicon layer are sequentially stacked.

The second electrode 134c is formed on the photoconductive layer 134 while facing the first electrode 134a. The second electrode 134c may include a transparent conductive material, such as ITO or IZO.

The second insulation layer 116 is formed on the entire surface of the first substrate 110 while covering the second photodiode PD2 and the second transistor Tr2. The second insulation layer 116 includes a single insulation layer or multiple insulation layers including, e.g., at least one of $SiN_x$ and $SiO_x$. The data line DL and the bias line BL are disposed on the second insulation layer 116.

The second insulation layer 116 includes an opening for exposing a part of the second electrode 134c of the second photodiode PD2 and an opening for exposing a part of the connector 132d. The bias line BL may be formed in the opening for exposing the part of the second electrode 134c to be electrically connected to the second electrode 134c of the second photodiode PD2. The data line DL may be formed in the opening for exposing the part of the connector 132d to be connected to the source electrode 132b. In another implementation, the connector 132d may be omitted so that the data line DL and the source electrode 132b are directly connected to each other.

The data line DL is formed to cross the gate line GL across the first and second insulation layers 115 and 116.

The bias line BL is formed parallel to the data line DL. The bias line BL and the data line DL may be formed from one conductive layer by using the above-described process, such as a photolithography process, and may include a single conductive layer or multiple conductive layers including, e.g., at least one of Al, Cr, Mo, Cu, Ti, Nd, W, Au, and Ag. The third insulation layer 117 is formed on an entire surface of the first substrate 110 while covering the bias line BL and the data line DL. The third insulation layer 117 may include a single insulation layer or multiple insulation layers including, e.g., at least one of $SiN_x$ and $SiO_x$.

The planarization layer 118 formed of an organic or inorganic material is formed on the third insulation layer 117.

The scintillator 119 is disposed on the planarization layer 118. The scintillator 119 changes the x-ray incident through a subject into a visible ray, and transmits the visible ray toward the first substrate 110. The scintillator 119 may be formed of, e.g., cesium iodide. A second substrate (not shown) may be disposed on the scintillator 119.

According to the present example embodiment, by not forming an active pattern on the second transistor Tr2, a channel through which the electric signal of the second photodiode PD2 is transmitted may be prevented from being formed. Accordingly, the readout IC 500 may only read out the noise signal of the data line DL.

In FIGS. 7 and 8, the first and second electrodes 134a and 134c of the second photodiode PD2 are formed. However, the photoelectric conversion function of the second photodiode PD2 may be blocked by removing at least one of the first and second electrodes 134a and 134c.

Figure 9:
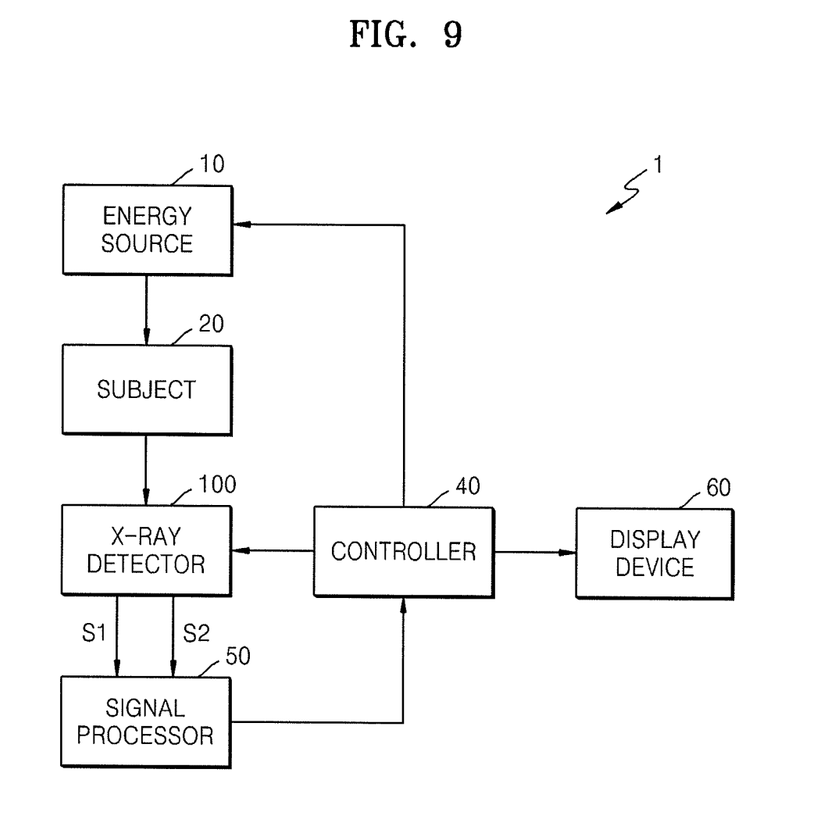
FIG. 9 is a block diagram schematically illustrating an x-ray detecting system according to an example embodiment.

FIG. 9 is a block diagram schematically illustrating an x-ray detecting system 1 according to an example embodiment.

In the example embodiment shown in FIG. 9, the x-ray detecting system 1 includes an energy source 10, an x-ray detector 100, a controller 40, a signal processor 50, and a display device 60.

The energy source 10 is a radiation irradiating unit for irradiating radiation, such as an x-ray, to a subject 20.

The x-ray detector 100 includes a plurality of photosensitive pixels for detecting the x-ray in a flat panel, and a plurality of dummy pixels for noise correction. The x-ray detector 100 may be the x-ray detector 100 including the panel including the photosensitive pixels OPX and the dummy pixels DPX described above with reference to FIGS. 1 through 8, and thus details thereof will not be repeated. The energy source 10 simultaneously irradiates an x-ray on the photosensitive pixels OPX in an active area and the dummy pixels DPX in a non-active area of the flat panel of the x-ray detector 100.

One approach for noise correction using a general x-ray detecting system includes obtaining a noise-removed image according to a difference between a dark image (obtained by a signal read out by applying a gate signal to a gate line after manufacturing a panel and before irradiating an x-ray to the panel, i.e., when the x-ray is not incident on the panel) and an x-ray image (obtained by a signal read out by applying a gate signal to a gate line when an x-ray is actually incident on the panel). However, a time difference would exist between a time t1 of obtaining the dark image and a time t2 of obtaining the x-ray image, and thus noise due to the time difference may be reflected in the noise-removed image.

The panel according to the current embodiment includes the dummy pixels in the non-active area outside the active area obtaining a signal of an effective image. Unlike a transistor of the photosensitive pixel, a transistor of the dummy pixel maintains a turned-off state without being turned on even if a gate signal is applied so as not to switch an electric signal of a photodiode. For example, the transistor of the dummy pixel does not include source and drain electrodes as shown in FIGS. 5 and 6, so that a channel to which an electric signal of a photodiode is transmitted is not formed or, in another implementation, the transistor of the dummy pixel does not include an active pattern as shown in FIGS. 7 and 8, so that a channel to which an electric signal of a photodiode is transmitted is not formed.

A readout IC of the x-ray detector 100 outputs a first signal S1 obtained by reading out an electric signal of the photosensitive pixel through a data line to the signal processor 50. Accordingly, the first signal S1 includes the electric signal of the photodiode and line noise on the data line.

The readout IC of the x-ray detector 100 outputs a second signal S2 obtained by reading out an electric signal of the dummy pixel through the data line to the signal processor 50. Since a channel is not formed as the transistor of the dummy pixel is turned off, the second signal S1 does not include the electric signal of the photodiode and only includes the line noise on the data line.

The controller 40 controls operations of the energy source 10, the x-ray detector 100, and the display device 60 to form an x-ray image of which noise is corrected. The controller 40 controls a point of time and duration of irradiating the x-ray of the energy source 10.

The signal processor 50 converts the electric signal output from the x-ray detector 100 to a digital signal. The signal processor 50 generates an effective image by receiving and sampling the first signal S1 output from the photosensitive pixel in the active area, and generates a noise image by receiving and sampling the second signal S2 output from the dummy pixel in the non-active area.

The signal processor 50 subtracts the noise image from the effective image, thereby generating, in real time, the x-ray image of which noise is removed (corrected).

The display device 60 displays the x-ray image. The display device 60 may be, e.g., a liquid crystal display device, an organic light emitting display device, or a plasma display device.

By way of summation and review, an x-ray detector may be used to detect an amount of x-rays that penetrate through a subject. The x-ray detector may detect the amount of x-ray penetrated through the subject, and display an internal state of subject on a display device. The x-ray detector may be generally used as a medical detecting device, a nondestructive detecting device, or the like.

The x-ray detector may operate using a flat panel digital radiography (DR) method, using DR instead of a film. The quality of an image obtained by the x-ray detector may be degraded by non-uniformity of a line or lines (e.g., data and gate lines) in an array of the x-ray detector, non-uniformity of a photodiode, a defect, and a leakage level difference.

Generally, in order to prevent the quality of image from deteriorating, image correction may be needed to remove noise from the line(s). As described above, however, embodiments may provide an x-ray detector and a method of driving the x-ray detector, wherein line noise of an x-ray image is effectively removed. An x-ray detector according to an example embodiment may includes photosensitive pixels generating an effective image corresponding to an x-ray image of a subject, and dummy pixels in a non display area of a panel, i.e., around the panel. A switching device of the dummy pixel may be formed that does not include, e.g., source and drain electrodes, or an active pattern, thereby maintaining a turned-off state regardless of a gate signal and blocking a photoelectric conversion signal of a photodiode. Accordingly, an x-ray may be simultaneously irradiated on the photosensitive pixels and the dummy pixels, and thus a separate unit blocking the x-ray from being irradiated on the dummy pixels may be omitted. Also, electric signals of the photosensitive pixel and dummy pixel may be simultaneously obtained through a data line without a time difference therebetween, and thus line noise may be effectively removed from an effective image, thereby improving image quality. Accordingly, image quality may be improved by using dummy pixels as well as photosensitive pixels for generating an effective image, and electric signals of the dummy pixel and photosensitive pixel may be obtained without a time difference therebetween, to remove line noise of the effective image.

While the present invention has been particularly shown and described with reference to example embodiments thereof, it will be understood by those of skill in the art that various changes in form and details may be made therein without departing from the spirit and scope of the present invention as defined by the following claims.

What is claimed is:

1. An x-ray detector, comprising:
    a plurality of photosensitive pixels each including a first photodiode generating an electric signal corresponding to an x-ray, and a first switching device turned on by a gate signal and outputting the electric signal from the photodiode through a data line; and
    a plurality of dummy pixels each including a second photodiode generating an electric signal corresponding to an x-ray, and a second switching device maintaining a turned-off state regardless of a gate signal and blocking the electric signal from being output from the second photodiode to the data line.

2. The x-ray detector of claim 1, wherein the plurality of photosensitive pixels is disposed in an active area generating an effective image, and the plurality of dummy pixels is disposed in a non-active area outside the active area.

3. The x-ray detector of claim 1, wherein the first photodiode comprises:
    a first electrode;
    a second electrode facing the first electrode and connected to a bias line; and
    a photoconductive layer disposed between the first and second electrodes.

4. The x-ray detector of claim 1, wherein the first switching device comprises:
    a gate electrode;
    an active pattern disposed on the gate electrode; and
    source and drain electrodes disposed on the active pattern.

5. The x-ray detector of claim 4, further comprising a connector electrically connecting one of the source and drain electrodes of the first switching device to the data line.

6. The x-ray detector of claim 1, wherein the second switching device comprises a gate electrode and an active pattern disposed on the gate electrode, and does not comprise source and drain electrodes.

7. The x-ray detector of claim 6, further comprising:
    a metal pattern disposed at one side of the active pattern of the second switching device; and
    a connector electrically connecting the metal pattern and the data line.

8. The x-ray detector of claim 1, wherein the second switching device comprises a gate electrode and source and drain electrodes disposed on the gate electrode, and does not comprise an active pattern.

9. The x-ray detector of claim 8, further comprising a connector electrically connecting one of the source and drain electrodes of the second switching device to the data line.

10. The x-ray detector of claim 1, further comprising a readout circuit reading out the electric signal of each of the plurality of photosensitive pixels and the electric signal of each of the plurality of dummy pixels through the corresponding data line.

11. The x-ray detector of claim 10, further comprising a signal processor obtaining an effective image based on the read out electric signal of each of the plurality of photosensitive pixels, obtaining a noise image based on the read out electric signal of each of the plurality of dummy pixels, and removing noise included in the effective image by subtracting the noise image from the effective image.

12. A method of driving an x-ray detector, the method comprising:
    irradiating an x-ray to a panel including a photosensitive pixel and a dummy pixel;
    sequentially outputting a gate signal to the panel to which the x-ray is irradiated;
    transmitting an electric signal corresponding to an x-ray from a photodiode connected to a switching device of the photosensitive pixel turned on by the gate signal, to a data line; and
    reading out an electric signal output by the photosensitive pixel and an electric signal output by the dummy pixel through the data line,
    wherein a switching device of the dummy pixel maintains a turned-off state regardless of the gate signal, and blocks an electric signal corresponding to an x-ray from a photodiode connected to the switching device of the dummy pixel from being transmitted to the data line.

13. The method of claim 12, wherein the photosensitive pixel is disposed in an active area generating an effective image, and the dummy pixel is disposed in a non-active area outside the active area.

14. The method of claim 12, further comprising obtaining an effective image based on the read out electric signal of the photosensitive pixel, obtaining a noise image based on the read out electric signal of the dummy pixel simultaneous with obtaining the effective image, and removing noise included in the effective image by subtracting the noise image from the effective image.

15. The method of claim 14, wherein a readout signal of the photosensitive pixel represents the electric signal of the photodiode and a noise signal of the data line, and a readout signal of the dummy pixel represents only the noise signal of the data line.

16. The method of claim 12, wherein the switching device of the dummy pixel comprises a gate electrode and an active pattern disposed on the gate electrode, and does not comprise source and drain electrodes so as to block transmission of the electric signal generated by the photodiode connected to the switching device of the dummy pixel.

17. The method of claim 12, wherein the switching device of the dummy pixel comprises a gate electrode and source and drain electrodes disposed on the gate electrode, and does not comprise an active pattern so as to block transmission of the electric signal generated by the photodiode connected to the switching device of the dummy pixel.

* * * * *